(12) United States Patent
Slaby (10) Patent No.: US 6,814,322 B1
(45) Date of Patent: Nov. 9, 2004

(54) DEVICE FOR REMOVING ENSILAGE FROM A COMPACTED ENSILAGE MASS

(76) Inventor: Kenneth A. Slaby, N. 35353 Richter Rd., Whitehall, WI (US) 54773

(*) Notice: Subject to any disclaimer, the term of this patent is extended or adjusted under 35 U.S.C. 154(b) by 15 days.

(21) Appl. No.: 10/117,926

(22) Filed: Apr. 5, 2002

Related U.S. Application Data (60) Provisional application No. 60/291,434, filed on May 16, 2001.

(51) Int. Cl.$^7$ ................................................ B02C 18/16
(52) U.S. Cl. ........................ 241/101.72; 241/101.74; 241/101.77; 241/277; 172/272; 414/607; 414/724
(58) Field of Search ................ 241/101.72, 101.75, 241/277, 292.1, 282.1, 293, 91, 92, 101.74; 144/174, 235; 172/272, 273; 299/39.1, 39.4, 39.9; 414/607, 686, 724, 920

(56) References Cited

U.S. PATENT DOCUMENTS

| | | | |
|---|---|---|---|
| 3,472,298 A | * 10/1969 | Vinogradov et al. | ........ 241/277 |
| 3,850,375 A | * 11/1974 | Ford | ............... 241/101.75 |
| 4,041,996 A | * 8/1977 | Grover | .................. 144/24.12 |
| 4,157,164 A | * 6/1979 | Helm et al. | ............ 241/101.72 |
| 5,495,987 A | 3/1996 | Slaby | |
| 5,794,866 A | * 8/1998 | Shinn | ................... 241/101.72 |

* cited by examiner

Primary Examiner—Allen Ostrager
Assistant Examiner—Jimmy Nguyen
(74) Attorney, Agent, or Firm—M. Paul Hendrickson (57) ABSTRACT

The invention is directed to an ensilage processing attachment for uniformly loosening and removing an uncompacted and free flowing ensilage product from a vertical face of a compacted ensilage mass, with minimal ensilage size reduction, when the attachment is mounted to a powered vehicle equipped with a power source for powering the attachment. The attachment includes a rotatable drum that is carried by a frame and equipped with a plurality of curved tooth members tangentially projecting outwardly in a substantially curved relationship to a rotational periphery generated by rotationally propelling the drum and curved tooth members circumferentially positioned about the drum so as to transversely remove the uncompacted ensilage product from the ensilage mass face. A powering means for rotationally propelling the drum along the face so as to uniformly loosen and remove the uncompacted ensilage therefrom is also present.

20 Claims, 7 Drawing Sheets

DEVICE FOR REMOVING ENSILAGE FROM A COMPACTED ENSILAGE MASS

CROSS-REFERENCE TO RELATED APPLICATIONS, IF ANY

This application claims the benefit under 35 U.S.C. §119 (e) of co-pending provisional application Ser. No. 60/291,434, filed May 16, 2001. Application Ser. No. 60/291,434 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to an ensilage removing device and, more particularly, to a device for converting compacted ensilage to a consumable ensilage form.

2. Background Information

Historically, farmers have harvested ensilage crops from their fields and stored the harvested ensilage in large storage units. The harvesting procedure generally entails field chopping the ensilage and blowing or dumping the chopped ensilage into a storage unit, such as vertical silos, pit or trench silos. In the case of open trench or pit silos, the ensilage is typically confined between two parallel walls open at one or sometimes both ends. The open ends afford mechanical access for removing the ensilage from the pit or trench. Tractors or skid steer loaders, equipped with forked buckets, are frequently used to remove compacted ensilage from these pit or trench silos. The current mechanical techniques for removing the ensilage are ineffective and often lead to substantial ensilage spoilage and waste.

Ensilage spoilage and waste is largely due to the ineffectiveness of current equipment in removing only what ensilage is needed while preserving the anaerobic and compacted character of the stored ensilage. As part of the harvesting and storage operations, the ensilage weight compacts the loosely chopped ensilage product into a dense, compacted ensilage mass. The loose and free flowing ensilage stems of the freshly harvested product become extensively intertwined within the mass and, thus, tenaciously hold the ensilage mass together in a dense, compacted ensilage product. Compacted ensilage of legume cropping is most difficult to remove from open pits or trench silos since the intertwined stemming tenaciously binds the ensilage together as a solid and compacted mass. The resultant compacted ensilage cannot be easily removed manually with a conventional manual or mechanical drum fork equipment. The technique of removing the compacted drum from the storage unit typically involves tearing and removing a compacted segment of the drum from the silo pit.

Preservation of the ensilage in an unspoiled state necessitates maintaining anaerobic conditions. Excessive exposure to air accelerates spoilage. The most common method for removing ensilage from a trench silo (by driving a forked or bucket loader into the trench and lifting or pulling a torn top layer of compacted drum from the silo or pit) fails to preserve the anaerobic conditions. The tearing of intertwined stemmings from the compacted ensilage mass creates a highly irregular, creviced and porous surface. The irregular and porous surface increases the total exposed surface area to air which in turn renders the exposed ensilage susceptible to oxidative deterioration and increased spoilage.

In my earlier patent, U.S. Pat. No. 5,495,987, issued Mar. 5, 1996, I have described an ensilage slicing device which uniformly slices compacted ensilage into ensilage particles from a compacted ensilage surface without adversely affecting the porosity or compactness of the unsliced regions of the compacted ensilage mass. The device described therein, converts the compacted ensilage into a forkable, consumable and uncompacted ensilage product. The ensilage slicing device includes a rotatable reel equipped with a plurality of slicing knives circumferentially positioned about the reel so as to uniformly slice ensilage transversely from a face of a compacted ensilage mass. A means for raising and lowering the reel along the ensilage face, and a means for rotationally propelling the reel along the ensilage face so as to uniformly slice and transversely remove the ensilage from the face of the compacted ensilage mass, are also included. The content of U.S. Pat. No. 5,495,987 is incorporated by reference herein.

The slicing knives described in U.S. Pat. No. 5,495,987 are of a planar or flat configuration such as a substantially flat surfaced knife equipped with sharpened cutting edges which are aligned upon the reel so as to transversely slice into a vertical face of compacted ensilage mass. The substantially flat slicing knives are positioned so as to project perpendicularly outwardly from the reel and to inwardly slice directly onto the face of the compacted ensilage product. The slicing action of the knives transversely slices the compacted ensilage along the compacted ensilage face and results in a uniform removal of sliced ensilage from the face to a depth onto which the substantially flat knives interiorly penetrate from the compacted ensilage face. The removed ensilage is provided in the uncompacted and fluffed form.

The described device of my prior patent easily removes the compacted ensilage by slicing the ensilage from the face of the compacted mass. The uncompacted ensilage produced routinely exhibits a reduction in particle size of up to 40 percent as a result of the slicing action by the knives of the reel. Other similar devices on the market likewise produce an uncompacted ensilage product of reduced particle size by cutting, slicing or otherwise tearing the ensilage. Although equally palatable to ruminants, such as dairy or beef cows, the reduced particle size ensilage can result in drop in milk production or slower muscle growth for these animals. It is believed that the smaller particle size of the ensilage results in reduced cud chewing in cattle, and possibly, to a condition termed "twisted stomach." Such production losses and the possible connection to serious health conditions for the animals consuming the ensilage is unacceptable to farmers.

In order to greatly reduce or eliminate the reduction in the particle size of uncompacted ensilage and, thereby, avoid production losses and animal health concerns, applicant has invented an improved ensilage processing attachment which overcomes these difficulties.

SUMMARY OF THE INVENTION

The invention is directed to an ensilage processing attachment for uniformly loosening and removing an uncompacted and free flowing ensilage product from a vertical face of a compacted ensilage mass with minimal ensilage size reduction, when the attachment is mounted to a powered vehicle equipped with a power source for powering the attachment. The attachment includes a supportive frame equipped with mounting means for mounting the frame to the powered vehicle. A rotatable drum is carried by the frame and equipped with a plurality of curved tooth members, tangentially projecting outwardly in a substantially curved relationship to a rotational periphery, generated by rotationally propelling the drum and curved tooth members circumferentially positioned about the drum so as to transversely remove the uncompacted ensilage product from the ensilage mass face, with minimal ensilage size reduction. A powering means for rotationally propelling the drum along the face, so as to uniformly loosen and remove the uncompacted ensilage therefrom, is also present.

The curved tooth members are positioned with all the curved points oriented toward the direction of rotation of the rotatable drum. Each curved tooth member digs into the compacted ensilage mass to dislodge and loosen ensilage without slicing or cutting the ensilage into smaller particles. The curved tooth members are arranged in helical patterns on the rotatable drum with all adjacent tooth members offset from any one tooth member. The tooth member structure and tooth member drum attachment pattern cooperatively interact to limit the bite of each tooth member while preventing kickback of the processing attachment device during operation.

DESCRIPTION OF THE EMBODIMENTS

| DESCRIPTION OF THE EMBODIMENTS | |
|---|---|
| Nomenclature | |
| 1 | Ensilage Dislodging Device |
| 2 | Frame of Device |
| 6 | Mounting Means for Frame |
| 7 | Journal Boxes |
| 10 | Rotatable Drum Member |
| 11 | Curved Tooth Members |
| 11b | Body Portion of Tooth Member |
| 11c | Concave Radial Base of Tooth Member |
| 11d | Pointed End of Tooth Member |
| 11e | Leading Edge of Tooth Member |
| 11f | Following Edge of Tooth Member |
| 12 | Steel Shaft Member |

-continued

| DESCRIPTION OF THE EMBODIMENTS | |
|---|---|
| Nomenclature | |
| 14 | Outer Circular Support Plate of Drum |
| 16 | Outer Circular Support Plate of Drum |
| 20 | Powering Means for Dislodging Device |
| 22 | Drive Gear |
| 24 | Drive Chain |
| 26 | Hydraulic Motor |
| 28 | Power Gear |
| 32 | Arm Member |
| 36 | Drum Shield Member |
| L | Vehicular Transport |
| H | Vehicular Power Source |
| V | Elevational Means |
| $S_d$ | Compacted Ensilage |
| $S_f$ | Uncompacted Ensilage |
| F | Vertical Face of Compacted Ensilage |

Construction

With reference to FIGS. 1–7, the present invention provides an ensilage dislodging device (generally referenced as 1) for converting compacted ensilage $S_d$ into a forkable and uncompacted ensilage $S_f$ by substantially dislodging and removing from a vertical face F of the compacted ensilage $S_d$ an uncompacted ensilage $S_f$ mass. The device 1 comprises a supportive frame (generally referenced as 2), equipped with mounting means (generally referenced as 6) for mounting the frame to a vehicular transport L. A rotatable drum (generally referenced as 10), is carried by the frame 2 and equipped with a plurality of curved tooth members 11 circumferentially positioned about the drum 10 so as to uniformly dislodge and remove a layer of the compacted ensilage $S_d$ from the face F. A powering means is present (generally prefixed by a 20 series enumeration) for rotationally propelling the drum 10 along the ensilage face F so as to uniformly dislodge and remove the uncompacted ensilage mass $S_f$ therefrom. The device 1 uniformly dislodges and removes compacted ensilage $S_d$ along a vertical face F without substantially altering the porosity and surface character of the compacted ensilage $S_d$ interiorly disposed beneath the face F, and most importantly, without substantially reducing the particle size of the ensilage material.

The curved tooth members 11, when rotated about the ensilage face F by the drum 10, uniformly dislodge and remove a substantially uniform layer of ensilage from the face F of the compacted ensilage mass $S_d$ as illustrated in FIGS. 4–7. The configuration and positioning of the curved tooth members 11 about the drum 10 permits curved tooth members 11 to transversely dig onto the face F of the compacted ensilage $S_d$. As explained in greater detail, the curved tooth members 11 are positioned about the drum 10 at staggered intervals such that curved tooth members 11 progressively dig in a lateral relationship to one another as the drum 10 rotates about the ensilage face F. The lateral digging action of curved tooth members 11, as the drum 10 rotates, creates a substantially smooth contoured facial surface F from the compacted ensilage mass $S_d$ without adversely affecting the compacted nature of interiorly disposed and unremoved ensilage mass $S_d$, such as illustrated in FIGS. 4–7. The use of substantially flat, curved tooth members 11 laterally positioned in sufficiently close proximity to one another, and in a rotationally staggered relationship upon the drum 10, permits the dislodged ensilage to freely fall in a particulated form from face F. The lateral inwardly digging movement of the curved tooth members 11 as the drum 10 moves about a rotational axis does not cut or slice the compacted ensilage $S_d$, only loosens it. The digging movement minimizes reduction in size of ensilage strands or stemmings from the compacted ensilage $S_d$ mass, while also alleviating creation of porous fissures or channels extending from the face F into the interior of compacted ensilage $S_d$. Creation of fissures or porous channels into the interior of the compacted ensilage $S_d$ renders the compacted ensilage $S_d$ susceptible to aerobic spoilage. Thus, a uniform and smooth surface about the face F, as effectuated by the progressive digging action of curved tooth members 11, results in a significant reduction in aerobic spoilage of the compacted ensilage mass $S_d$.

A suitable transport (generally referenced as L) for device 1, as depicted in FIGS. 4–7, JD includes a transport L equipped with an appropriate power source (generally referenced as H) for driving the power means (prefixed by 20 series number) for rotationally propelling the drum 1O. A r variety of different power sources H and drive means 20 may be used to propel the drum 10.

The transport L is also suitably equipped with elevational means (generally referenced as V and externally shown as booms) for raising and lowering the drum 10 along the ensilage face F and 45 depth adjusting means (e.g. wheeled transport L) for adjusting the depth of removal along the face F of the compacted ensilage mass $S_d$. The device 1 may, if desired, be provided as a self-propelled unit (not shown) equipped with the appropriate power source H to effectively dislodge and remove the compacted ensilage $S_d$ from the face F. In the preferred embodiments, the device 1 is most appropriately provided as an attachment or accessory unit 1 for attachment and operational use to a conventional skid steer transport, pay loader, tractor loader or telehandler L, such as depicted in FIGS. 4–7. As will be observed from the drawings, the device 1 may be operationally hooked onto a conventional skid steer loader L. As normally associated with the operational use of skid steer loaders L, the use of the device 1, in combination with a skid steer loader L, affords exceptional maneuverability and compactness of operation.

The front mounting of the device 1 to a skid steer loader L also provides a clear visual line of sight for the operator onto the work site. As commonly recognized, such skid steer loaders L are also conventionally equipped with powered wheels W for moving the skid steer L to and from a work site, namely in this case, to and from the face F of the compacted ensilage mass $S_d$. The depicted skid steer loader L is also equipped with conventional elevational means (generally referenced as V), shown more particularly as booms V, for raising and lowering the device 1 along the ensilage face F. Typical of conventional skid steer loaders, the depicted loader L is further equipped with a hydraulic power source (generally referenced as H) for attaching the hydraulic hoses H, so as to provide hydraulic power for hydraulic motor 26.

The accessory device 1, shown in the Figures, includes a supportive frame (generally referenced as 2) for carrying the drum 10 and mounting means (generally referenced as 6) for mounting the device 1 onto transport L. The depicted supportive frame 2 includes a pair of opposingly positioned, triangular-shaped support brackets (generally referenced as 2L and 2R) of sufficient structural strength to support the device 1. Support brackets 2L and 2R are mirror images of one another. The left triangular support bracket 2L includes an upper support rail 2A, and a lower support rail 2B, connected together at a triangular apex by a front rail 2C and, at an opposite side, by a proximate rail 2D. The right triangular support frame 2R similarly includes an upper support rail 2A, a lower support rail 2B, a front rail 2C and rear rail 2D, as may be observed from FIGS. 1a–1c. A supportive cross bar 2E, bridging between the triangular supports 2L and 2R, serves to strengthen the supportive frame 2 between the drum 10 and the vehicular transport L, as well as affording an appropriate support for mounting the motor drive means 20 onto the frame 2. The cross support rail 2E, accordingly, includes a suitable motor mount 2M for mounting the hydraulic motor 26 thereto. The front rails 2C of the triangular support brackets 2L and 2R are each fitted with a pillow block 7 for housing roller bearing races upon which the shaft 12 of the drum 10 is axially mounted.

Duplicate downwardly extending arms 32 are respectively affixed onto the lower support rail 2B of the triangular support brackets 2L and 2R, which serve as vertical stands for stopping the vertical decline of the drum 10 when the device 1 is operationally lowered. Each of the upper top rails 2A of the triangular support braces 2L and 2R are fitted with a protective shield mount 2P, which serves to mount a protective shield 36 onto the frame 2. The backside of drum 10 includes a protective shield 36 which protects an operator from errant ensilage as it is dislodged from the r compacted mass $S_d$.

With reference to the Figures, the ensilage dislodging device 1 of this invention includes a drum 10 axially mounted to the frame 2 and equipped with a plurality of planer protruding curved tooth members 11. The drum 10 includes a left outer circular support plate 14, and a right outer circular support plate 16. A steel shaft 12, extending through the longitudinal center of the drum 10 and securely welded onto the left outer plate 14 and the right outer plate 16, contributes reinforcement to the drum 10, while also providing a means for axially mounting the drum 10 to the journal boxes 7 of the frame 2.

Figure 1A:
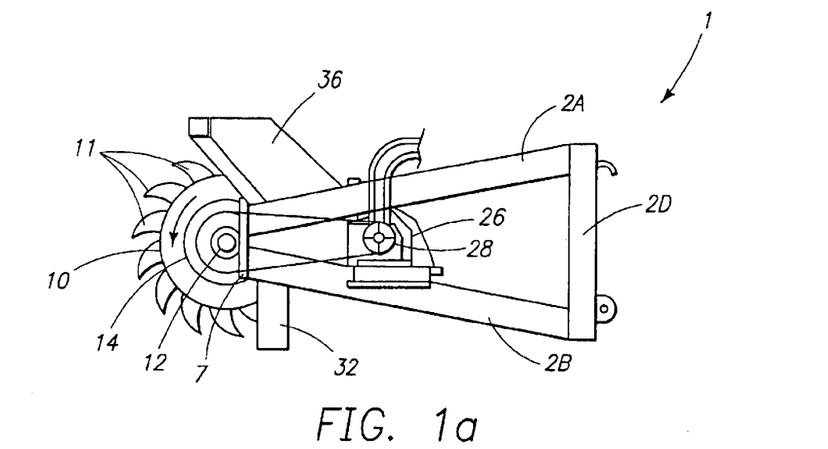
FIG. 1a is a plan side view of the ensilage processing assembly of the present invention.
Figure 1B:
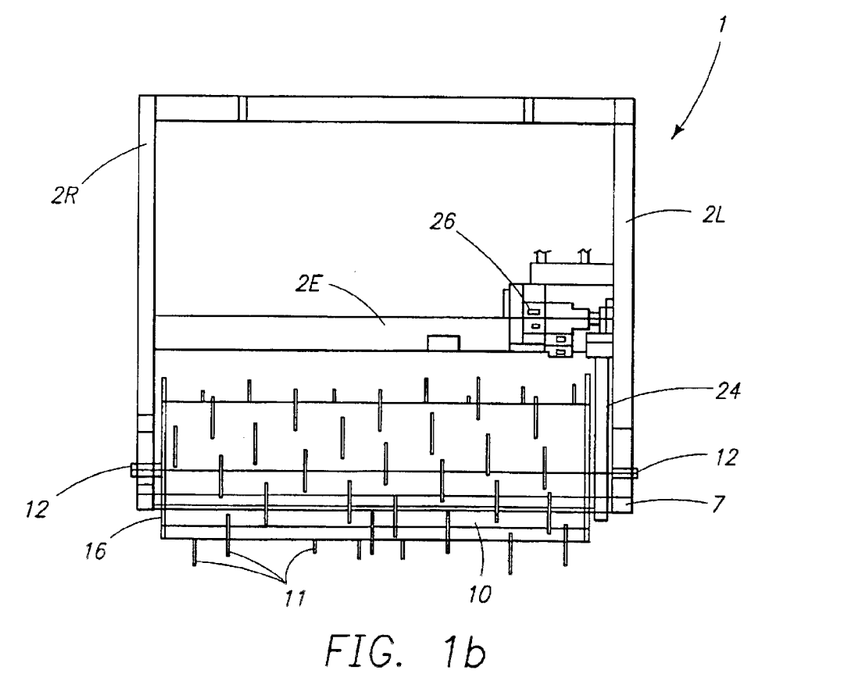
FIG. 1b is a plan top view of the ensilage processing assembly of the present invention.
Figure 1C:
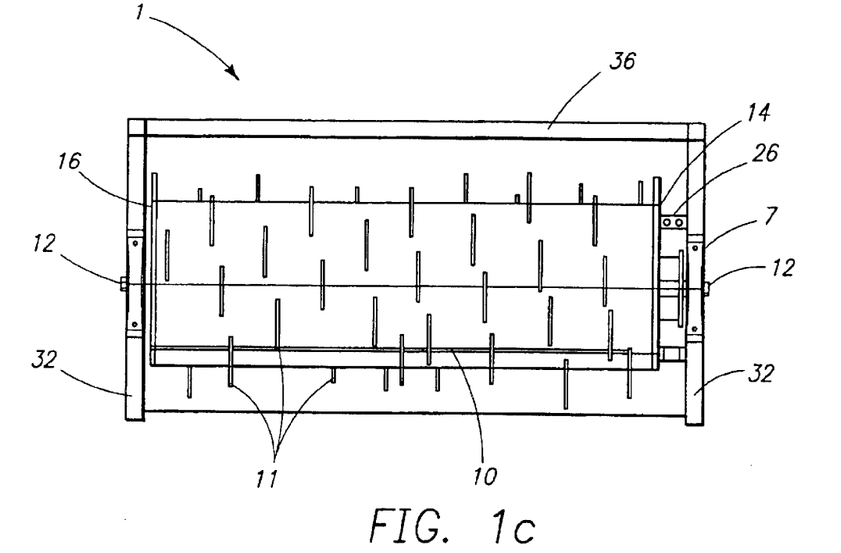
FIG. 1c is a plan front end view of the ensilage processing assembly of the present invention.

The number of curved tooth members 11 and the lateral alignment of curved tooth members 11 upon the drum 10 should be sufficient so as to allow the curved tooth members 11 to substantially, uniformly dig into the ensilage face F as the drum 10 rotates about the shaft 12. The lateral placement of the curved tooth members 11 about the drum 10 should be sufficiently close to one another to permit dislodgment of the compacted ensilage $S_d$ stemmings into an uncompacted and flowable ensilage mass $S_f$. The curved tooth members 11 may be appropriately staggered in such a manner that the rotation of the drum 10 will effectuate a lateral digging movement of subsequent passes across the ensilage face F of the compacted drum $S_d$. This may be accomplished, as illustrated in FIG. 1c, by staggering or off-setting each successive row of curved tooth members 11 from the proceeding alignment of the blades 11 upon the drum 10 to provide more uniform dislodging action against the vertical face F as the drum 10 rotates upon the face F of the compacted ensilage mass $S_d$ Additionally, the curved tooth members 11 are arranged in a helical pattern when tracing the tooth member pattern from adjacent tooth members 11 in adjacent tooth rows.

With respect to the depicted device 1, the drum 10 is preferably about 18 inches in diameter, with the curved tooth members 11 laterally spaced apart from one another a distance of approximately 8 inches. The curved tooth members 11 are shown as being staggered upon the drum 10 so that upon rotational movement, each successive curved tooth members 11 rotationally moving onto the ensilage face F, will laterally shift the digging action against face F by a factor of about one (1) inch. The off-setting of the curved tooth members 11 is advantageously, positionally aligned in such a manner that the next succeeding digging action of the curved tooth members 11 will be less than about 4 lateral inches and, typically, less than about 3 lateral inches. Preferably, the curved tooth members 11 are staggered, so that as the drum 10 rotates, the next successive row of curved tooth members 11 acting against face F will be less than about 2 inches and, preferably, about one inch apart.

In the depicted device 1, the curved tooth members 11 are positioned with all the curved points oriented toward the direction of rotation of the rotatable drum 10. Each curved tooth member 11 digs into the compacted ensilage mass to dislodge and loosen ensilage without slicing or cutting the ensilage into smaller particles. The curved tooth members 11 are arranged in helical patterns on the rotatable drum 10, with all adjacent tooth members 11 offset from any one tooth member. Significantly, the tooth member structure and tooth member drum attachment pattern cooperatively interact to limit the bite of each tooth member 11 while preventing kickback of the processing attachment 1 during operation. The Figures depict in detail a suitable power means (generally referenced as 20) for axially rotating and powering the shaft 12. The shaft 12 is fitted with a drive gear 22 driven by a drive chain 24, which is in turn powered by a power gear 28 of the hydraulic motor 26. The hydraulic motor 26 is adapted for operational connection to a suitable hydraulic source, such as conventionally provided with the illustrated skid steer loader L.

FIGS. 4–7 depict a cross-sectional view of a trench silo partially filled with compacted ensilage $S_d$, and the device 1 being used to dislodge ensilage from a face F of compacted ensilage $S_d$. Skid steer, tractor loader, pay loader or telehandler vehicles L provide an appropriate vehicular means W (wheels) for bringing the drum 10 in contact with a vertical face F of compacted ensilage $S_d$ In operational use, as depicted in FIGS. 4–7, the operator drives the powered vehicle L to the vertical face F of the compacted ensilage mass $S_d$, engages the hydraulic motor 26 which illustratively drives the drum 10 at about 300 rpm, and when properly positioned, dislodges compacted ensilage $S_f$ and uniformly removes a facial layer of about 2 inches to about 8 inches from the vertical face of the compacted ensilage mass $S_d$ Uniform removal of the dislodged and uncompacted ensilage $S_f$ from the face F may be effectively accomplished by raising and lowering booms V while rotating the drum 10 along the vertical face F of the compacted ensilage $S_d$. The curved tooth members 11 dislodge the intertwined stemmings from the compacted ensilage $S_d$ into a free flowing mass $S_f$, which gravitationally falls from the ensilage face F onto the floor or ground, as illustrated by FIGS. 4–7. The removed, uncompacted or free-flowing sliced ensilage $S_f$ is of a substantially lesser density than the compacted ensilage mass $S_d$. The ensilage processed by this device 1 is similar in physical character to a freshly harvested ensilage crop, which is unlike the compacted ensilage mass $S_d$ in that it may be easily forked and moved about with a standard ensilage fork. A conventional loader bucket may then be effectively used to scoop and transport ensilage $S_f$ to the animal feed site.

Figure 2:
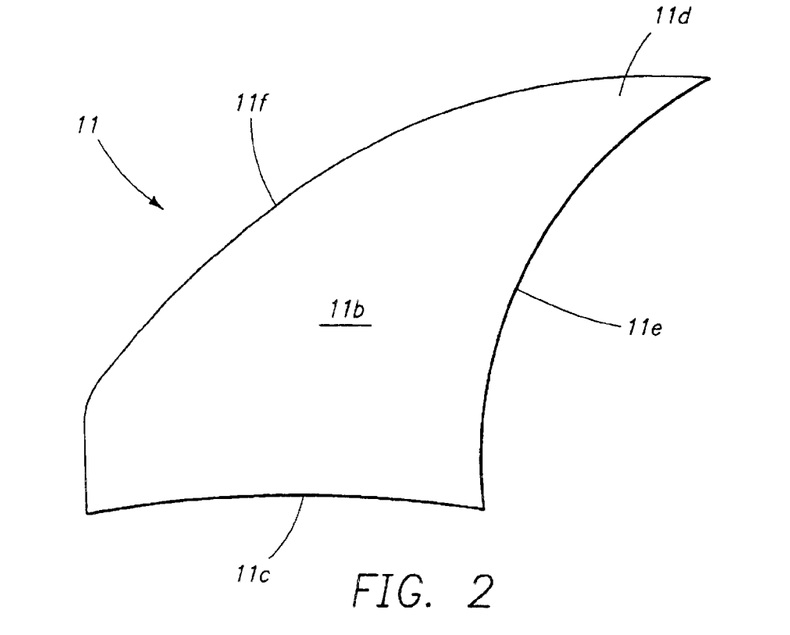
FIG. 2 is a plan side view of one tooth member of the ensilage processing assembly of the present invention.
Figure 3:
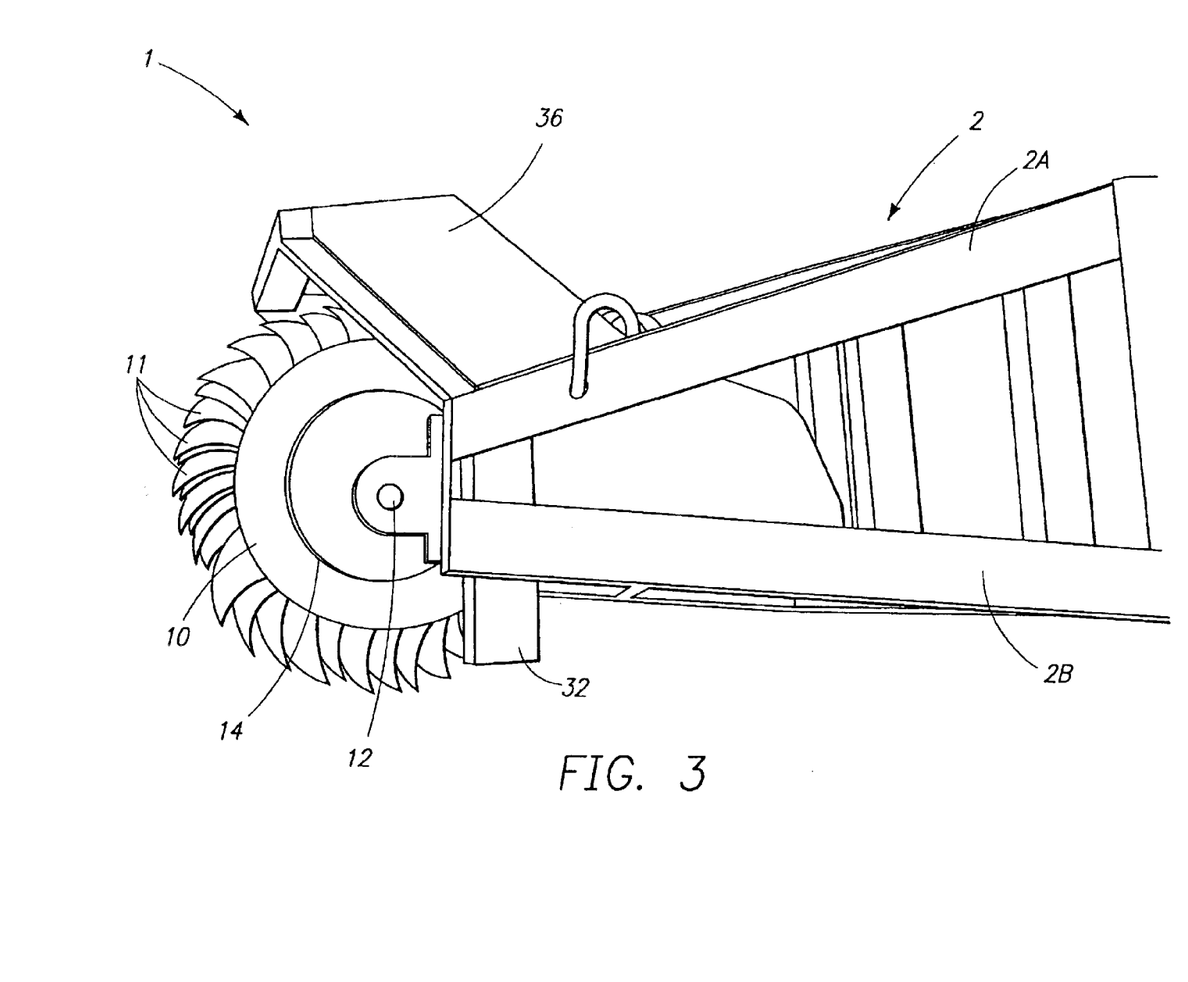
FIG. 3 is another plan side view of the ensilage processing assembly of the present invention.
Figure 4:
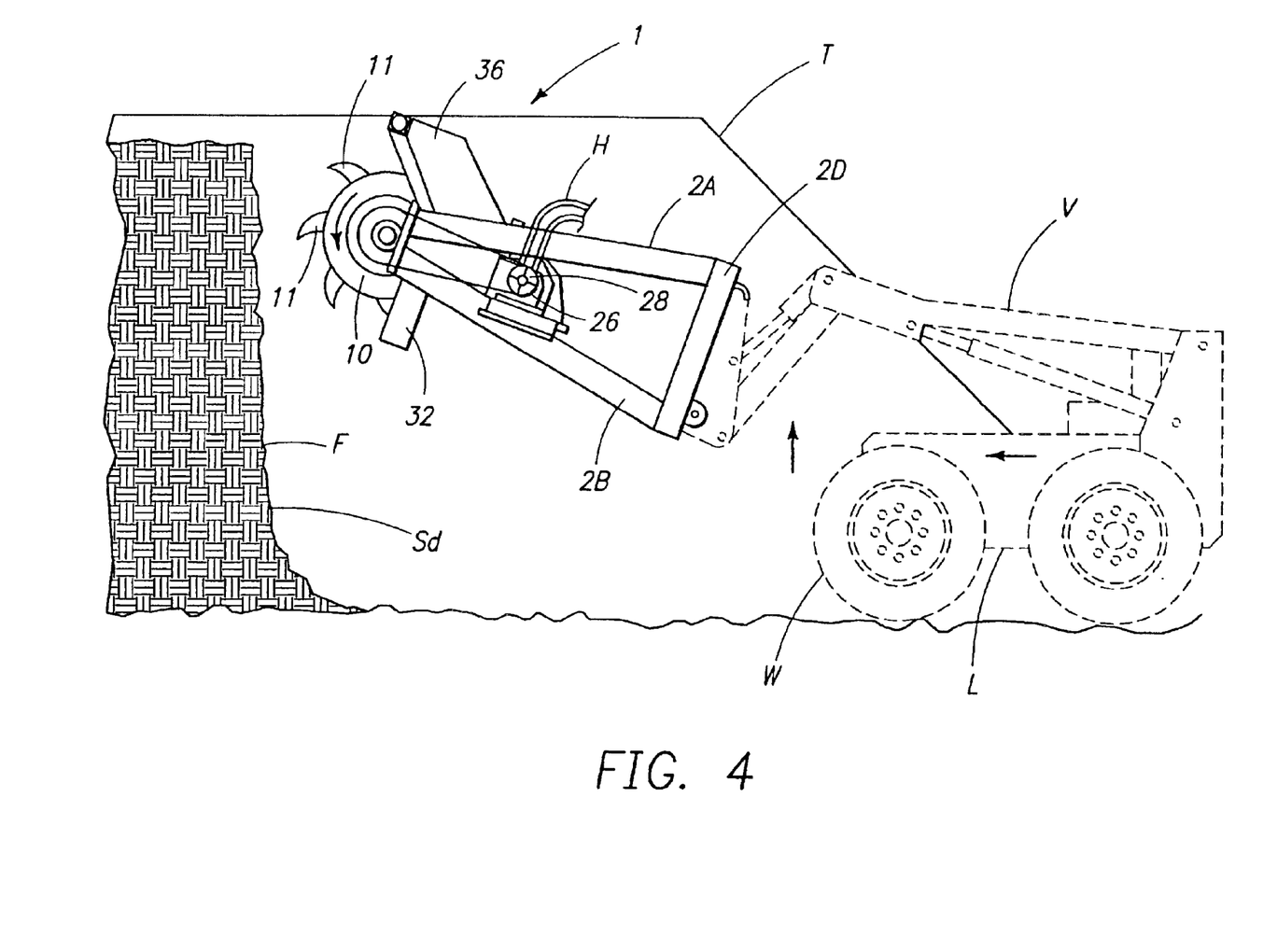
FIG. 4 depicts an operational side view of the assembly of the present invention mounted onto a powered vehicle.
Figure 5:
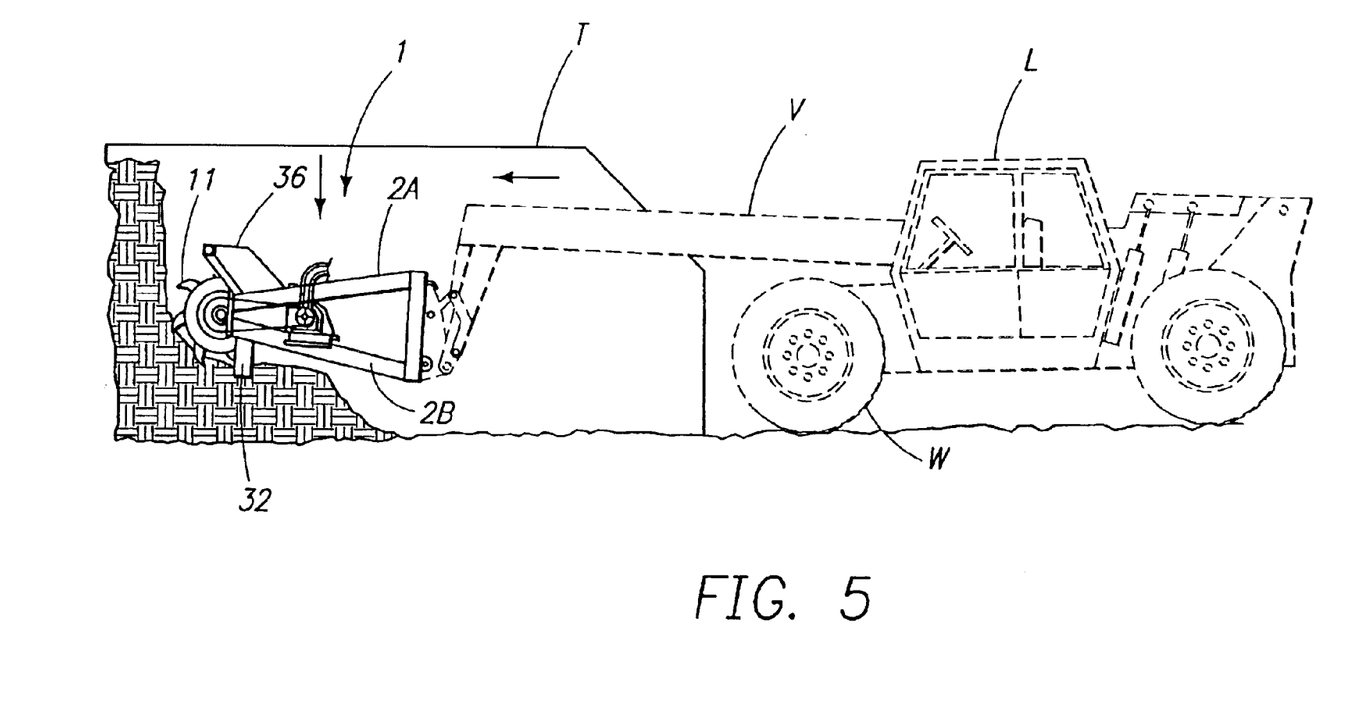
FIG. 5 depicts an operational side view of the assembly of the present invention mounted powered vehicle.
Figure 6:
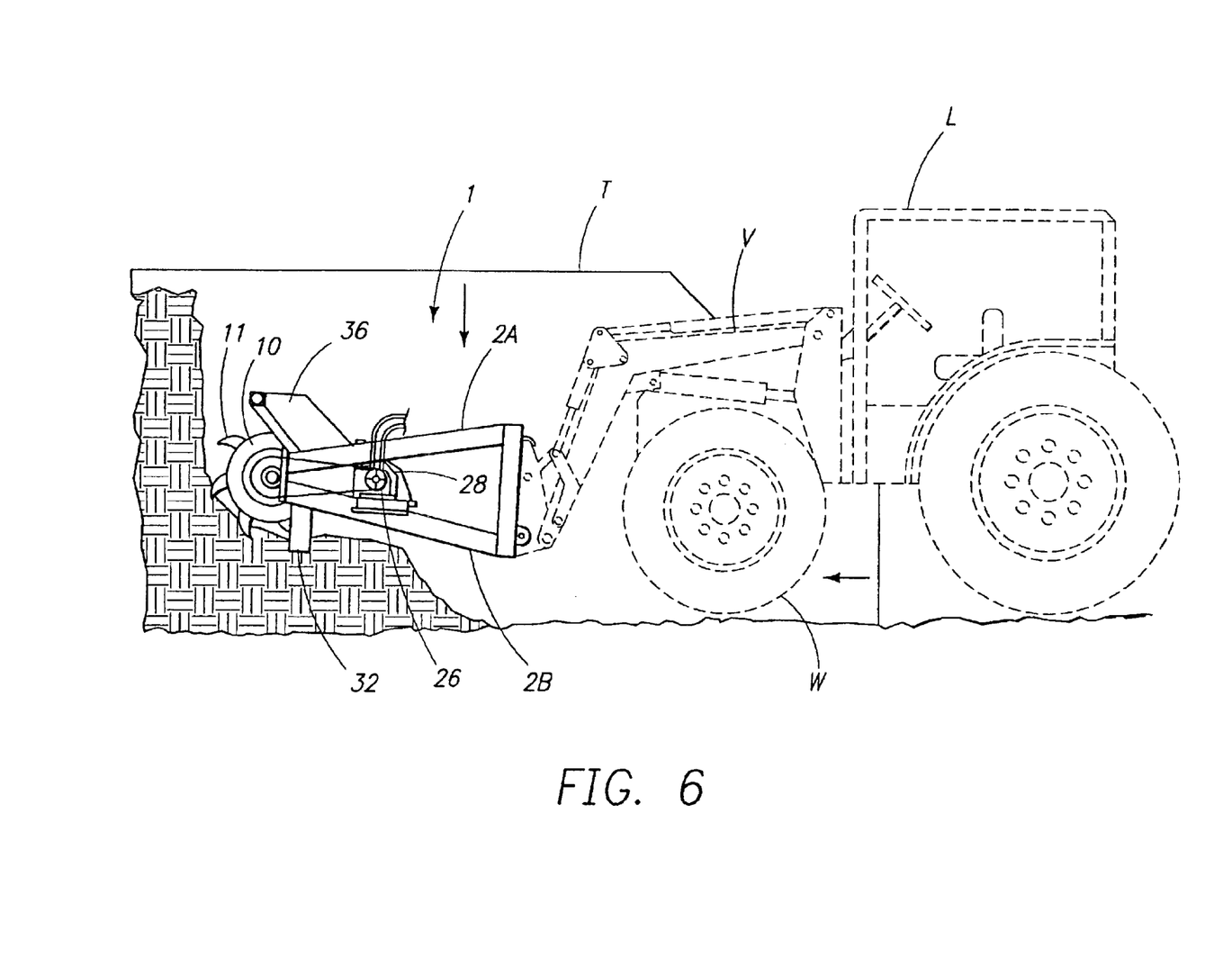
FIG. 6 depicts an operational side view of the assembly of the present invention mounted powered vehicle.
Figure 7:
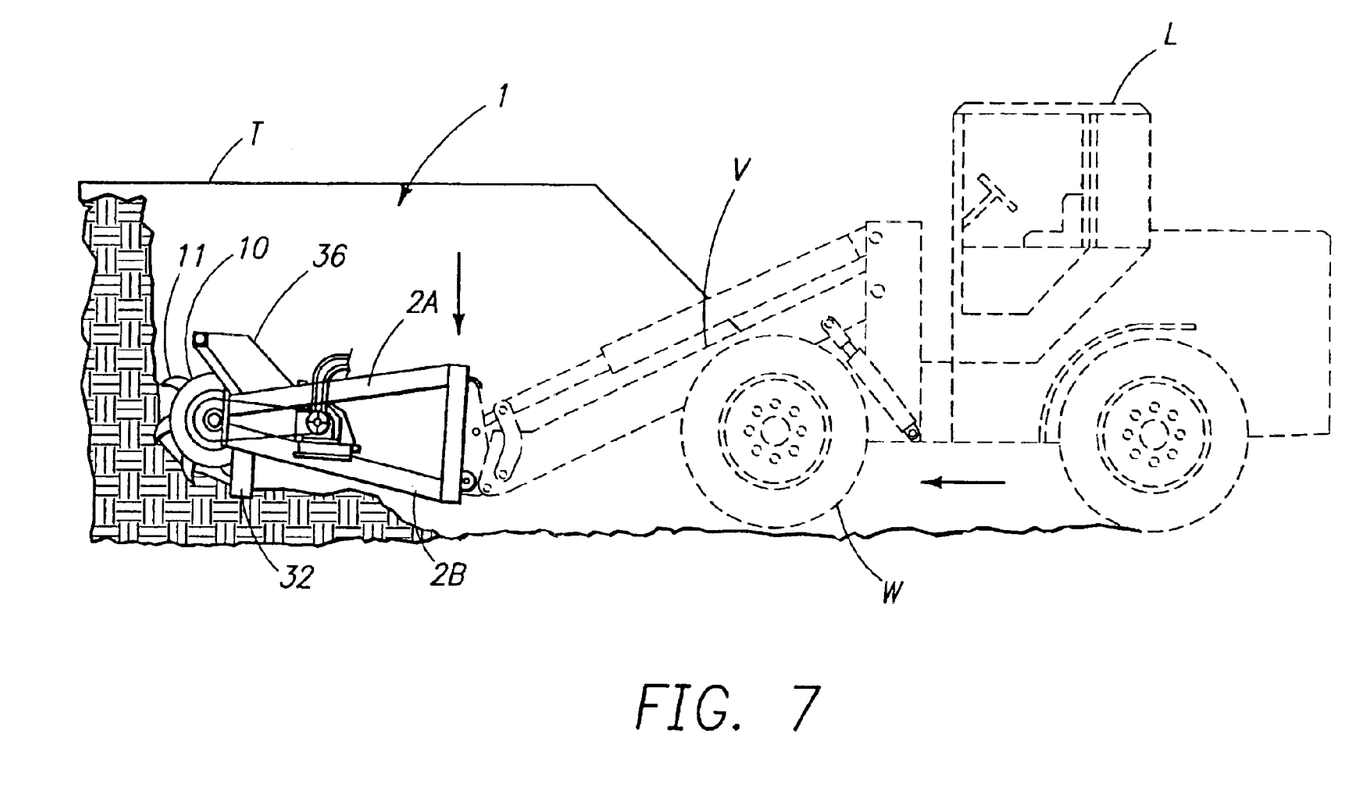
FIG. 7 depicts an operational side view of the assembly of the present invention mounted powered vehicle.

The curved tooth members 11 are positioned upon the drum 10, so that the curved tooth members 11 transversely contact the face F of the compacted ensilage mass $S_d$. The curved tooth members 11, accordingly, loosen and dislodge the compacted ensilage $S_d$ along a path transverse to a circumferential rotational plane formed by the rotation of drum 10. The loosening and dislodging action of curved tooth members 11 is thus aligned along a plane transversely disposed to the face F of the compacted ensilage mass $S_d$. Referring to FIG. 2, the preferred embodiment of the curved tooth members 11 of the invention is shown. The curved tooth members 11 consist essentially of a planer tooth member body 11b having a concave radial base portion 11c for attachment to the rotatable drum 10. The attachment is preferably by welding of each tooth member 11 to the drum 10. Each tooth member 11 has a curved, pointed end portion 11d, a leading edge portion 11e and a following edge portion 11f. Most preferably, the leading edge portion 11e is curved with a radius of about 3.5 units, while the following edge portion 11f is curved with a radius of about 4.0 units. Each curved tooth member 11 individually project outwardly and transversely to the outer circumferential periphery of the drum 10, with the curved, pointed end portion 11d of each tooth oriented in the direction of drum rotation. Most preferably, the substantially flat, curved tooth members 11 are positioned about the outer periphery of the drum 10 in a substantially perpendicular relationship to the drum 10 as shown in the drawings. The curved tooth members 11 are arranged in multiple helical patterns around the surface of the drum 10, with each adjacent tooth member slightly offset from the adjacent tooth member of the helix, as shown in FIGS. 1b and 1c. Referring to FIG. 3, a side view of the drum 10 and attached curved tooth members 11 shows the multiple tooth members 11 presented to the ensilage face F. The tooth members 11 are self-cleaning, self-sharpening and of an anti-grabbing design when in use for dislodging ensilage. As a particular tooth member 11 begins to contact the ensilage face F, the following edge portion 11f of an adjacent tooth member contacts the ensilage surface F, thereby limiting the penetration of the entering tooth member pointed end portion 11d. This limited penetration sequence continually occurs as the drum 10 with the helical array of tooth members 11 rotates against the ensilage face F. The limited tooth penetration also limits the reduction in particle size of the loosened ensilage $S_f$. This limitation of tooth members 11 penetration also reduces power requirements for operating the ensilage dislodging device 1 of the present invention.

As may be observed from the Figures, the curved tooth members 11 operationally loosen and dislodge the ensilage face F up to a curved tooth members depth, which, for standard curved tooth members 11, amounts to about 2.5 inches in depth. As mentioned above, the curved tooth members 11 upon the drum 10 are staggered in relationship to the proceeding row of curved tooth members 11, so that each successive rotational movement of the drum 10 moves the contact points across the drum face. Because of the effectiveness of the device 1, a relatively small power supply is needed as a power source. In operation, the device 1 uniformly dislodges and gravitationally removes free flowing, minimally sliced particles $S_f$ from the face of the compacted ensilage mass $S_d$. Since aeration and oxidation are a major cause of ensilage spoilage, the mechanism whereby the present device 1 evenly and uniformly removes surface ensilage from a face F, without substantially altering the desired compacted nature of the remaining unremoved face, substantially reduces ensilage spoilage. The device 1 is particularly effective when used to dislodge densely packed legumous masses to a more free flowing and consumable ensilage form, without a reduction in particle size of the ensilage.

The present invention also includes an assembly comprising an ensilage dislodging device 1 combined with a vehicular transport device L equipped with an appropriate power source H for actuating the drive means 20 used to propel the drum 10 of the device 1.

While the invention has been particularly shown and described with reference to preferred embodiments thereof, it will be understood by those skilled in the art that various changes inform and details may be made therein without departing from the spirit and scope of the invention.

I claim:

1. An ensilage processing attachment for uniformly loosening and removing an uncompacted and free flowing ensilage product from a vertical face of a compacted ensilage mass, with minimal ensilage size reduction, when the attachment is mounted to a powered vehicle equipped with a power source for powering the attachment, the attachment consisting essentially of;
   (a) a supportive frame equipped with mounting means for mounting the frame to the powered vehicle;
   (b) a rotatable drum carried by the frame and equipped with a plurality of substantially flat curved tooth members tangentially projecting outwardly in a substantially curved relationship to a rotational periphery generated by rotationally propelling the drum and curved tooth members circumferentially positioned about the drum so as to transversely remove and dislodge the uncompacted ensilage product from the ensilage mass face and permit the dislodged uncompacted ensilage product to free fall from the vertical face without substantially reducing particle size of the ensilage mass; and
   (c) powering means for rotationally propelling the drum along the ensilage mass face so as to uniformly loosen and dislodge and cause the free fall of the dislodged uncompacted ensilage from the vertical face.

2. The ensilage processing attachment of claim 1 wherein, each curve tooth member includes a planar body member with a concave radial base portion secured to the drum, a curved leading edge portion, a curved following edge portion, and a curved, pointed end portion.

3. The ensilage processing attachment of claim 1 wherein, the plurality of curved tooth members positioned about the drum all curve in a direction of drum rotation.

4. The ensilage processing attachment of claim 1 wherein, the plurality of curved tooth members are positioned about the drum in a staggered spacial arrangement.

5. The ensilage processing attachment of claim 1 wherein, the plurality of curved tooth members are positioned about the drum in helical arrangements.

6. The ensilage processing attachment of claim 1 wherein, the curved tooth members are spatially aligned upon the drum to create upon each rotation of the drum a lateral digging action by said tooth members varying from about one inch to about two inches.

7. An ensilage processing attachment for uniformly loosening and removing an uncompacted and free flowing ensilage product from a vertical face of a compacted ensilage mass, with minimal ensilage size reduction, when the attachment is mounted to a powered vehicle equipped with a power source for powering the attachment, the attachment consisting essentially of;
   (a) a supportive frame equipped with mounting means for mounting the frame to the powered vehicle;
   (b) a rotatable drum carried by the frame and equipped with a plurality of curved tooth members tangentially projecting outwardly in a substantially curved relationship to a rotational periphery generated by rotationally propelling the drum and curved tooth members circumferentially positioned about the drum so as to transversely remove and dislodge the uncompacted ensilage product from the ensilage mass face and permit the dislodged ensilage to free fall from the face, without substantially reducing particle size of the ensilage mass;
   (c) each curve tooth member including a substantially flat planar body member with a concave radial base portion secured to the drum, a curved leading edge portion, a curved following edge portion and a curved, pointed end portion; and
   (d) powering means for rotationally propelling the drum along the ensilage mass face so as to uniformly loosen and dislodge the uncompacted ensilage from the face and cause the dislodged uncompacted ensilage to free fall from said face.

8. The ensilage processing attachment of claim 7 wherein, the plurality of curved tooth members positioned about the drum all curve in a direction of drum rotation.

9. The ensilage processing attachment of claim 7 wherein, the plurality of curved tooth members are positioned about the drum in a staggered spacial arrangement.

10. The ensilage processing attachment of claim 7 wherein, the plurality of curved tooth members are positioned about the drum in helical arrangements.

11. The ensilage processing attachment of claim 7 wherein, the curved tooth members are spatially aligned upon the drum to create upon each rotation of the drum a lateral digging action by said tooth members varying from about one inch to about two inches.

12. An ensilage processing attachment for uniformly loosening and removing an uncompacted and free flowing ensilage product from a vertical face of a compacted ensilage mass, with minimal ensilage size reduction, when the attachment is mounted to a powered vehicle equipped with a power source for powering the attachment, the attachment consisting essentially of;
   (a) a supportive frame equipped with mounting means for mounting the frame to the powered vehicle;
   (b) a rotatable drum carried by the frame and equipped with a plurality of curved tooth members tangentially projecting outwardly in a substantially curved relationship to a rotational periphery generated by rotationally propelling the drum and curved tooth members circumferentially positioned about the drum so as to transversely remove and dislodge the uncompacted ensilage product from the ensilage mass face, with minimal ensilage size reduction in a freely falling particulated product form without substantially reducing particle size of the compacted ensilage mass;
   (c) each curve tooth member including a planar body member with a concave radial base portion secured to the drum, a curved leading edge portion, a curved following edge portion and a curved, pointed end portion;
   (d) the plurality of curved tooth members positioned about the drum with the curved, pointed end portions all curving in a direction of drum rotation; and
   (e) powering means for rotationally propelling the drum along the ensilage mass face so as to uniformly loosen and dislodge the uncompacted ensilage as a freely falling particulated product form therefrom.

13. The ensilage processing attachment of claim 12 wherein, the plurality of curved tooth members are positioned about the drum in a staggered spacial arrangement.

14. The ensilage processing attachment of claim 12 wherein, the plurality of curved tooth members are positioned about the drum in helical arrangements.

15. The ensilage processing attachment of claim 12 wherein, the curved tooth members are spatially aligned upon the drum to create upon each rotation of the drum a lateral digging action by said tooth members varying from about one inch to about two inches.

16. An ensilage processing assembly for uniformly loosening and removing an uncompacted and free flowing ensilage product from a vertical face of a compacted ensilage mass with minimal ensilage size reduction consisting essentially of
  (a) a powered vehicle equipped with a power source for powering an ensilage processing attachment; and
  (b) an ensilage processing attachment mounted to the powered vehicle equipped with a power source for powering the attachment, the attachment including;
    (i) a supportive frame equipped with mounting means for mounting the frame to the powered vehicle;
    (ii) a rotatable drum carried by the frame and equipped with a plurality of curved tooth members tangentially projecting outwardly in a substantially curved relationship to a rotational periphery generated by rotationally propelling the drum and curved tooth members circumferentially positioned about the drum so as to transversely remove the uncompacted ensilage product from the ensilage mass face in the form of a free falling particulated uncompacted ensilage mass, without substantially reducing particle size of the ensilage mass;
    (iii) each curve tooth member including a planar body member with a concave radial base portion secured to the drum, a curved leading edge portion, a curved following edge portion and a curved, pointed end portion; and
    (iv) powering means for rotationally propelling the drum along the ensilage mass face so as to uniformly loosen and remove the free falling uncompacted ensilage particulated product from the face.

17. The ensilage processing assembly of claim 16 wherein, the plurality of curved tooth members positioned about the drum all curve in a direction of drum rotation.

18. The ensilage processing attachment of claim 16 wherein, the plurality of curved tooth members are positioned about the drum in a staggered spacial arrangement.

19. The ensilage processing attachment of claim 16 wherein, the plurality of curved members are positioned about the drum in helical arrangements.

20. The ensilage processing attachment of claim 16 wherein, the curved tooth members are spatially aligned upon the drum to create upon each rotation of the drum a lateral digging action by said tooth members varying from about one inch to about two inches.

* * * * *